United States Patent [19]
Adam

[11] Patent Number: 5,496,048
[45] Date of Patent: Mar. 5, 1996

[54] GOLF CART

[76] Inventor: Gunter Adam, Ostendstrasse 3a, 94315 Straubing, Germany

[21] Appl. No.: 171,529

[22] Filed: Dec. 22, 1993

[30] Foreign Application Priority Data

Oct. 23, 1993 [DE] Germany ............... 43 36 185.4

[51] Int. Cl.⁶ ................................. A63B 55/08
[52] U.S. Cl. .................... 280/42; 280/652; 280/43.1; 280/47.18; 280/47.315; 280/DIG. 6
[58] Field of Search ................... 280/645, 646, 280/651, 652, 655, 40, 42, 43.1, 43.15, 43.16, 47.17, 47.18, 47.24, 47.315, 64, DIG. 6

[56] References Cited

U.S. PATENT DOCUMENTS

| Re. 26,536 | 3/1969 | Dawson | 280/645 |
|---|---|---|---|
| 2,781,202 | 2/1957 | Odin | 280/DIG. 6 |
| 2,812,950 | 11/1957 | Holloway | 280/42 |
| 2,855,208 | 10/1958 | Abgarian | 280/DIG. 6 |
| 3,784,138 | 1/1974 | Herling | 280/DIG. 6 |
| 4,793,622 | 12/1988 | Sydlow | 280/40 |

FOREIGN PATENT DOCUMENTS

| 0483101 | 5/1952 | Canada | 280/DIG. 6 |
|---|---|---|---|
| 4007358 | 9/1990 | Germany. | |

*Primary Examiner*—Anne Marie Boehler
*Attorney, Agent, or Firm*—Rosenman & Colin

[57] ABSTRACT

A golf cart has a supporting frame formed of articulated struts that can be folded during use and can be unfolded to form storage elements for the golf cart.

16 Claims, 5 Drawing Sheets

GOLF CART

BACKGROUND OF THE INVENTION

1. Field of the Invention

The present invention relates to a golf cart.

2. Discussion of Related Art

A golf cart is known from German Patent Application 40 07 358 which has the advantage, among others, that the supporting frame of the golf cart is formed solely by the storage elements and the golf cart therefore is of relatively simple construction, has great stability, particularly in its operating configuration. It is of low weight, and, when not in use, takes up only a small amount of space, so that the golf cart can be easily transported. The two storage elements, which are swingably connected to each other and are arranged in triangular shape when the golf cart is in use, are connected to each other, or held relative to each other, in this condition of use by transverse struts of a transverse-strut arrangement on the bottom of the golf cart.

SUMMARY OF THE INVENTION

The object of the invention is to develop a golf cart of this type that, while being easy to handle, assures a dependable and reliable interlocking of the storage elements in use.

In order to achieve this object, the present invention provides a golf cart having two rigid box-like or frame-like storage elements, each of which forms several compartments for golf clubs and are the load-bearing elements of the golf cart. The storage elements are swingably connected to each other at their top side around a longitudinal axis of the golf cart and can be swung around this axis from a position of non-use, in which the storage elements are adjacent each other, into an unfolded position, in which the storage elements form the sides of a triangle and form with each other an angle which is open towards the bottom of the golf cart. A transverse-strut arrangement is provided on the bottom of the storage elements which, in the position of use of the golf cart, fixes the distance apart of the storage elements, and has at least two transverse strut elements which are pivoted by their outer ends in each case by means an outer joint having a pivot pin to the bottom of a storage element and by their inner ends are pivotally connected to each other in the region of a vertical central plane of the golf cart which contains the longitudinal axis of said golf cart at an articulation having at least one axis of swing. When the golf cart is in the unfolded condition, the transverse struts are arranged coaxially or substantially coaxially and transverse to the central plane with lock means in order to lock the transverse struts in their position corresponding to the unfolded condition. A handlebar is held on the transverse-strut arrangement. The articulation has clamping means by means of which the articulation can be brought from a first condition in which the articulation has clearance in the manner that the inner ends of the transverse strut are swingable by a predetermined amount in the region of the articulation in a plane in which the at least one swing axis of this articulation lies, into a second condition in which the transverse struts are connected with the articulation without this clearance, or substantially without this clearance. The lock means is formed by a projection on one transverse strut as well as by a recess on the other transverse strut or by at least one projection on a transverse strut and a corresponding recess on the articulation, in such a manner that the projection which engages in the corresponding recess is locked in the recess with clamping means present in the second position.

As a result of the spring elements, which are preferably provided on the outer joints and by which each of the transverse struts is at its outer ends attached to the storage elements, the result is obtained that in the unfolded position of use of the golf cart these outer joints have no or practically no play. Furthermore, the transverse struts are urged by these spring elements to swing around an axis perpendicular to the axis of the outer joints in such a manner as to obtain, at the same time, spring-actuated engagement of the projection forming the detent into the corresponding opening. Due to the clamping or holding means, the articulation for the inner ends of the transverse struts is then fixed in position in the manner that a swinging of these transverse struts relative to each other around the said additional axis of swing is no longer possible, and thus the detent-forming projection of the corresponding recess is fastened.

Further developments of the invention are described below.

BRIEF DESCRIPTION OF THE DRAWINGS

The invention will be explained in further detail with reference to an embodiment shown in the accompanying drawings, in which.

DETAILED DESCRIPTION OF PREFERRED EMBODIMENT

Figure 1:
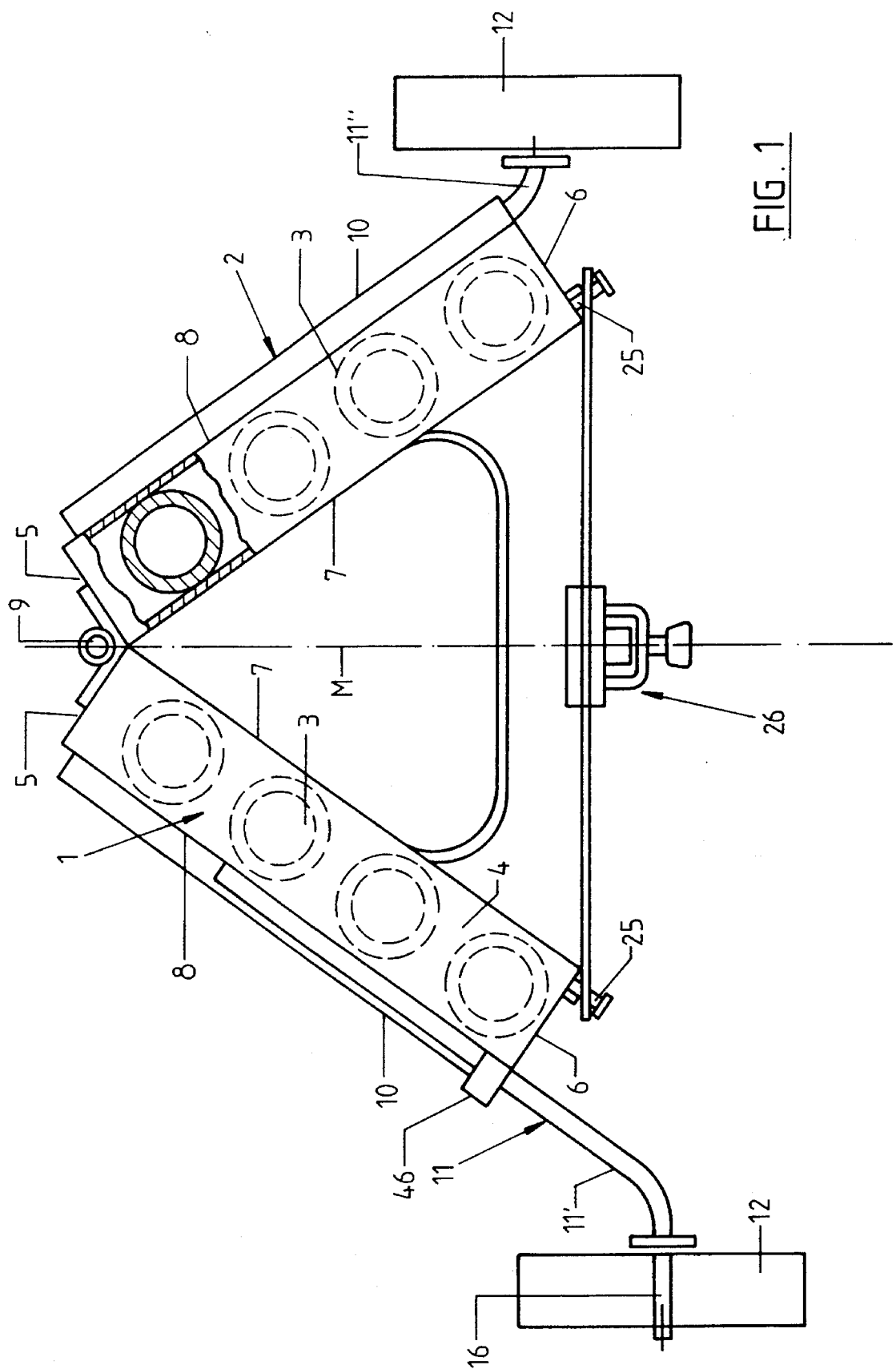
FIG. 1 shows diagrammatically in top view a collapsible golf cart according to the invention in its unfolded condition or condition of use, one of the wheels being shown in the unfolded position and the other wheel in the folded position.
Figure 2:
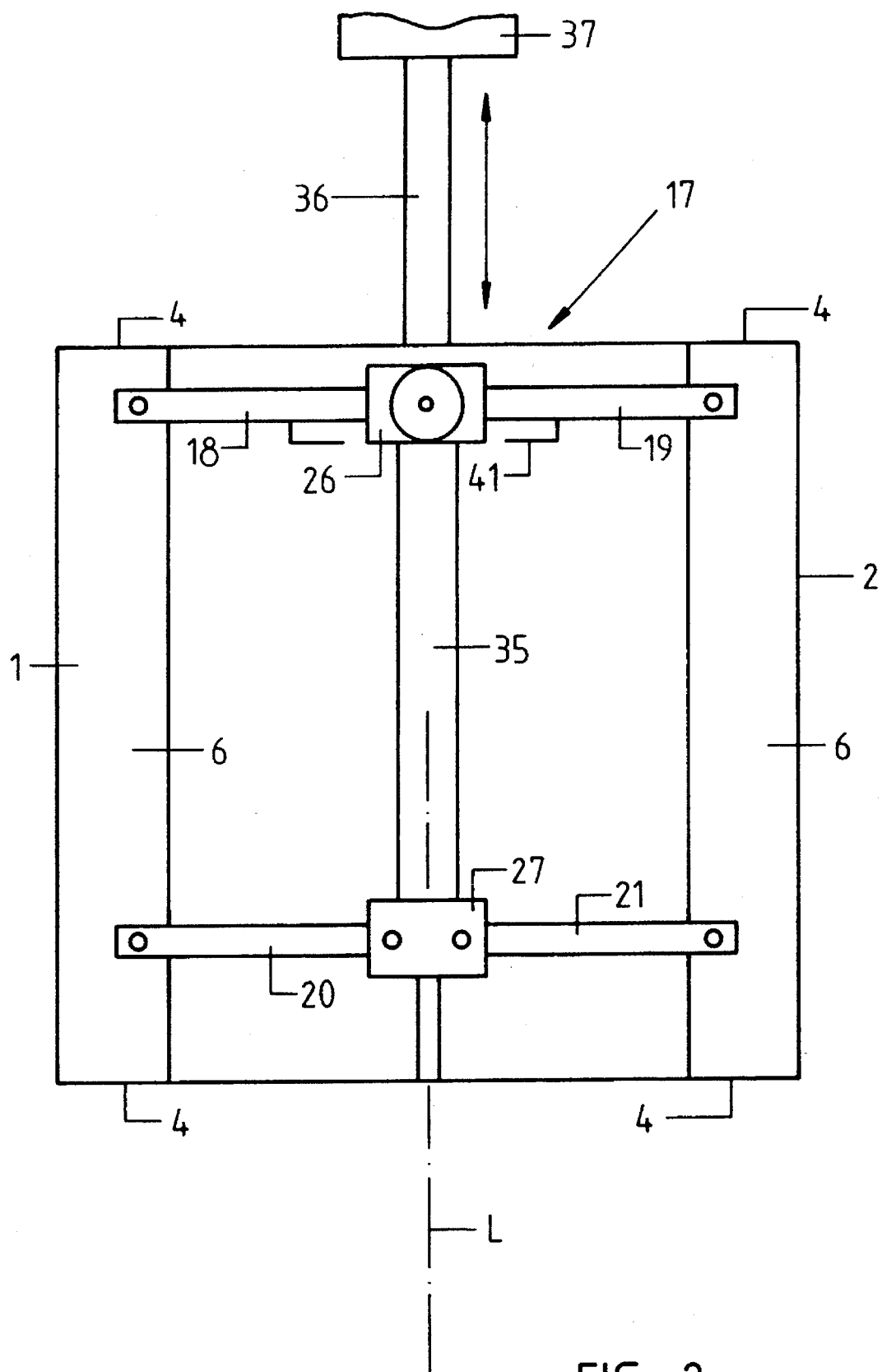
FIG. 2 is a simplified diagrammatic showing of the golf cart of FIG. 1, seen in a view from below.

The golf cart shown in the figures consists essentially of the two storage elements 1 and 2, which form the supporting frame to receive the golf clubs and consist in the embodiments shown therein of four tubes 3 arranged parallel to each other, the tubes being held at the two ends of the golf cart on wall elements 4 which are present there and which, together with the tubes 3, and further wall elements, in particular wall elements 5 and 6 on the top and bottom respectively of each storage element 1 and 2, are rigidly connected with the corresponding storage element.

The tubes 3 which form the receivers for the golf clubs are open at the one wall element 4 provided on the front of the golf cart. On the inner and outer side surfaces 7 and 8 respectively, each of the storage elements 1 and 2 the outer shape of which is that of a flat block, is closed by a fabric covering. The tubes 3 consist, for instance, of plastic or light metal (aluminum or aluminum alloy). The wall elements 4–6 are made, for instance, of plastic or of light metal. In principle, it is possible to provide further elements in order to stiffen the storage elements 1 and 2, which further elements can then also be made of plastic or light metal, for instance aluminum or an aluminum alloy, so as to result in a light weight for the golf cart as a whole.

On their upper side and in the region of the wall 6, the two storage elements 1 and 2 are articulated by at least two hinges 9 which are spaced from each other in the longitudinal direction L of the golf cart, i.e. in the direction of the axis of the tubes 3, the articulation being effected around a single pivot axis which corresponds to the aforementioned axis or the axis of the corresponding single pivot pins of the hinges 9.

On each of the outer side surfaces 8 there is provided a guide 10, the lengthwise direction which is perpendicular to the longitudinal axis of the golf cart, within which guide a foot or wheel support 11 is displaceable and lockable in such a manner that it is movable in the direction of the axis 10 between a position of use in which the bottom end bearing the wheel 12 of said wheel support protrudes downward by a large length 11' beyond the corresponding storage element 1 or 2, and a position of non-use in which the bottom end bearing the wheel 12 of the wheel support 11 extends, to be sure, only by a short length 11" beyond the bottom of the corresponding wheel element 2 or 1, respectively. In the embodiment shown, the guides 10 extend, in each case, from the top (wall 5) to the bottom (wall 6) of the corresponding storage elements 1 and 2 respectively, so that each guide 10 at the same time also effects a stiffening of the corresponding storage element.

Figure 7:
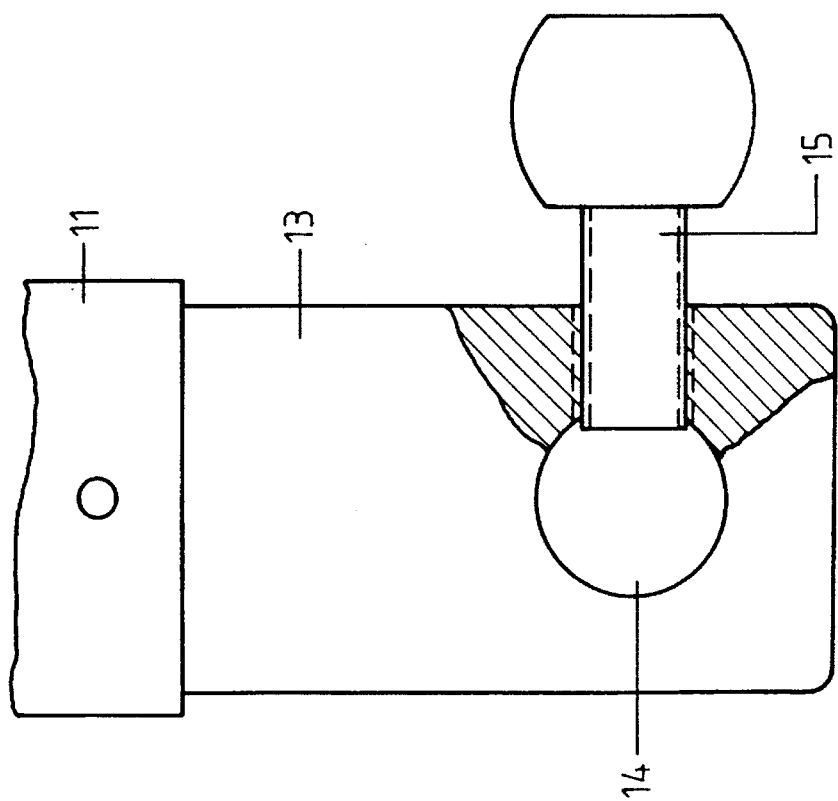
FIG. 7 is an enlarged view of the lower end of one of the wheel supports.

Furthermore, in the embodiment shown in FIG. 7, a holding or bearing piece 13 made of aluminum having an opening 14 and a clamping screw 15 is provided at the lower end of each wheel support 11. Into the opening 14 there can be inserted an axle 16 on which the corresponding wheel is freely rotatable. By means of the clamping screw 15 this wheel axle can then be clamped fast. In similar manner, the wheels 12, together with their axles 16, can be detached by loosening the clamping screws 15. It is obvious that the wheels provided on the wheel supports 11 are rotatable in each case around an axis perpendicular to the longitudinal axis L.

On the bottom of the storage elements 1 and 2 and on the wall 6 at that place, there is provided a transverse-strut arrangement 17 by which the two storage elements 1 and 2 are so connected to each other in unfolded condition that the storage elements 1 and 2, as well as the transverse-strut arrangement 17, form a triangular structure of high strength for the golf cart and, for the folded position, the two storage elements 1 and 2 can be swung towards each other in such a manner that their inner side surfaces 7 are directly adjacent each other in the folded position of non-use.

The transverse-strut arrangement 17 is shown in detail in FIGS. 2–5. This arrangement consists essentially of two pairs of transverse struts, namely the transverse struts 18 and 19, which are provided on the front side of the golf cart, and the transverse struts 20 and 21, which are provided on the rear of the golf cart.

Each transverse strut 18–21 is pivoted at one end to the bottom of a storage element 1 or 2 respectively, namely on the pivot pin 22 provided there, which extends through an opening 23 in the corresponding end of the corresponding transverse strut and rests, via a head 24 of enlarged cross section, against the bottom of this transverse strut, it sitting on the rubber element the outer surface of which has the shape of a circular cylinder or a rubber buffer 25, which forms a stop surface for the top of the corresponding transverse strut 18–21. The axis of the pivot pin 22 is perpendicular to the plane of the lower wall 6 and thus, when the storage elements 1 and 2 are swung apart, i.e. are in the position of use, it forms with the corresponding transverse strut 18–21 an angle of less than 90°, which angle opens towards the center of the strut arrangement 17. In the position of use, the head 24 rests against the bottom of the corresponding transverse strut and the region of the edge of the rubber buffer 25 facing a central plane M of the golf cart rests, with elastic deformation of its material, under spring action against the top of this transverse strut. The rubber buffer 25 thereby exerts a moment of rotation on this transverse strut around an imaginary swivel point which is formed by the place of passage of the pivot pin through the opening 23, namely in a direction of swing indicated by the arrow A which lies in a vertical plane which contains the lengthwise direction of the corresponding transverse strut and the axis of the corresponding pivot pin 22.

In the center of the transverse-strut arrangement 17 or the region of the central plane M, the two transverse struts 18 and 19 are in each case pivoted with an inner end to an articulation 26. A similar articulation 27 is provided for the two transverse struts 20 and 21 in the center of the transverse-strut arrangement 17.

Figure 3:
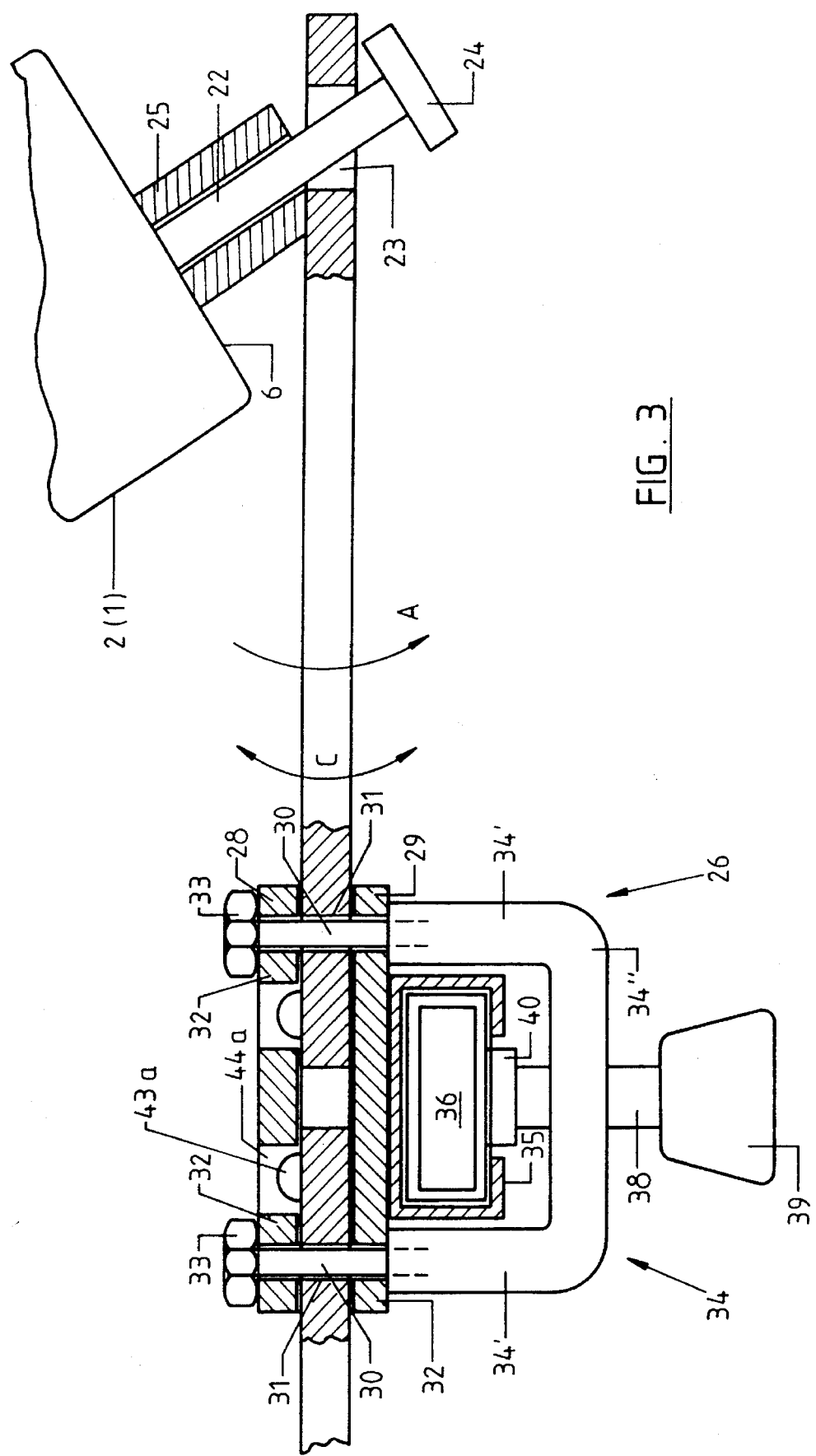
FIG. 3 is an enlarged front view of one of the two transverse-strut arrangements.

FIG. 3 shows the articulation 26 in greater detail. It consists of two plates 28 and 29, the plate 28 facing the top of the golf cart and the plate 29 being located on its lower side. The inner ends of the transverse struts 18 and 19 extend into a region formed between the plates 28 and 29 and are held there swingably between the plates or on the articulation 26 by means of a pivot pin 30 forming a pivot axis which passes through an opening 31 in the corresponding transverse strut. The diameter of the pivot pins 30 and of the openings 31 is so selected as to result in a clearance of predetermined size, in such a manner that the transverse struts 18 and 19 are swingable by a predetermined amount around an axis perpendicular to the pivot pins 30. The axis of the pivots pins 30 and thus the axes of swing lie in each case perpendicular, or substantially perpendicular, to the longitudinal axis L of the golf cart and perpendicular to the plane in which the longitudinal axes of the transverse struts 18 and 19 lie when the golf cart is in its position of use. Furthermore, the axes of the pivot pins 30 are perpendicular to the surface sides of the plates 28 and 29. The pivot pins 30 also pass through openings 32 in the plates 28 and 29 in such a manner that axial displacement of the pivot pins 30 relative to the plates is possible to a certain extent. On the top side of the plate 28 facing away from the plate 29, a self-locking nut 33, by which the pivot pin rests against the plate 28, is screwed onto each pivot pin 30. The lower end of each pivot pin 30 is screwed into an arm 34' of a U-shaped member or yoke 34 in such a manner that the free end of said arm 34' which end faces away from the crossbar 34" of the yoke 34 which connects together the arms 34', lies opposite the bottom of the plate 29. The yoke 34 comprises a C-shaped guide rail which extends in the longitudinal direction L between the articulations 26 and 27 and is fastened to each articulation on the bottom of the plate 29 located there. The guide rail 35 serves to receive the handlebar 36 of the golf cart, which is formed of a closed hollow member and is displaceable in the direction of the longitudinal axis L from its unfolded position, in which the handle provided on the free end of the handlebar 36 protrudes far beyond the front side of the golf cart, into a folded position, in which the length of the handlebar protruding forward beyond the storage elements 1 and 2 is greatly reduced. On the yoke 34 or on the crossbar 34" present there, there is provided a clamping screw 38 which, on its end protruding downward beyond the yoke 34, has a hand grip 39 and at its end protruding beyond the crossbar 34" has a plate 40. By the plate 40 the clamping screw 38 can press against the handlebar 36 arranged in the guide rail 35, as a result of which not only is the handlebar clamped fast in the guide rail 35, but the upper plate 28 is also pressed via the transverse struts 18 and 19 against the lower plate 29, and the transverse struts 18 and 19 are therefore clamped between the plates 28 and 29 so that the existing clearance is removed from the articulations of the articulation 29.

The articulation 27 is developed in the same manner as the articulation 26, with the difference, however, that, in this case, the yoke 34 does not have the clamping screw 38 and the nuts 33 are so adjusted that the central ends of the transverse struts 20 and 21 are swingable there with only slight play between the plates 28 and 29.

Figure 4:
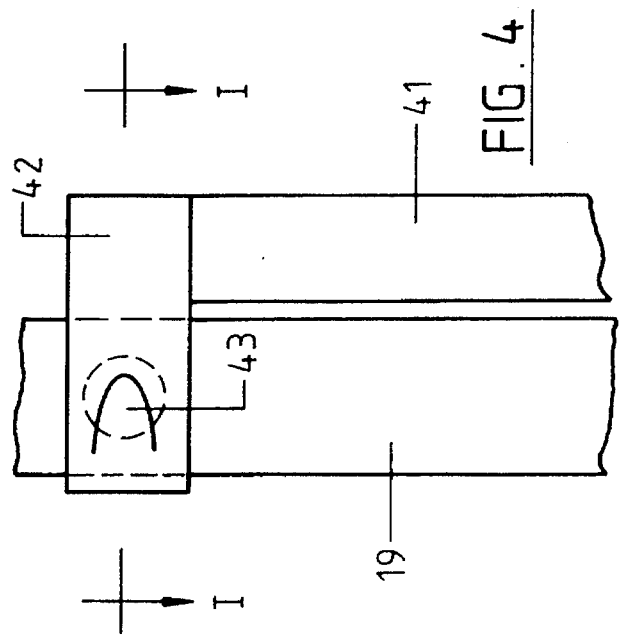
FIG. 4 shows in detail, in top view, an alaternate detent or interlock arrangement in the transverse-strut arrangement of FIG. 3.
Figure 5:
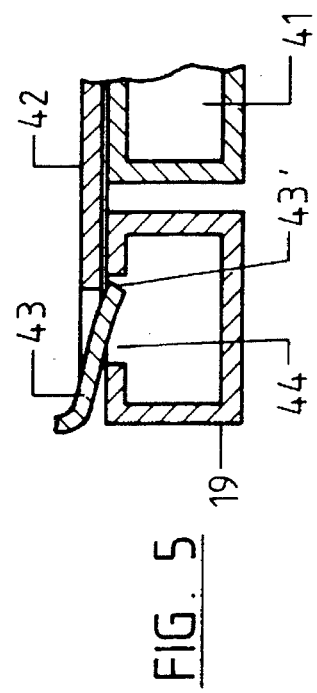
FIG. 5 is a section along the line I—I of FIG. 4.

In its middle region, there is welded onto the transverse strut 18 one end of an auxiliary arm 41, the length of which is offset parallel to the length of the transverse strut 18, but to the side thereof. The auxiliary arm 41 is located in this connection on the side of the transverse strut 18 facing the rear of the golf cart, i.e. facing the transverse struts 20 and 21, and, with the storage elements 1 and 2 in the position of use, bridges over the articulation 26 in such a manner that the other, free end of the auxiliary arm 41 lies adjacent to the side of the transverse strut 19 facing the rear of the golf cart as seen in FIG. 4. At its free end, the auxiliary arm 41 is provided with a strap 42 which is so arranged and protrudes laterally beyond the auxiliary arm 41 that, when the golf cart is in the position of use, said strap lies against the transverse strut 19. A tab 43 is formed by partial punching out of the strap 42, its free end 43' which faces away from the free end of the strap 42 protruding from the auxiliary arm 41, engaging in an opening 44 in the transverse strut 19 when the golf cart is in position of use. The strap 42 and its tab thus form an interlock.

The transverse-strut arrangement 17 operates in the following manner:

When the golf cart is in its folded, the transverse struts 18 and 19, as well as 20 and 21, are swung into a position in which the lengthwise directions of the transverse struts 18 and 19, and also of the transverse struts 20 and 21, each form an acute angle which opens towards the front side of the golf cart. This folded position and the pushed-back position of the handlebar 36 are fixed by tightening the clamping screw 38 so that the golf cart can be handled easily by grasping the handle 37 and, in view of its small dimensions, can also be conveniently placed in a motor vehicle, for instance in the trunk of a passenger car. The wheel supports 11 are, in this connection, also in their folded position of non-use. The wheels 12 can possibly be removed by loosening the clamping elements 15.

In order to bring the golf cart into the unfolded position, the clamping screw 38 is opened so that the storage elements 1 and 2 can then be swung apart around the hinges 9 until the transverse struts 18 and 19 and 20 and 21 respectively, associated with each other, have their axes lying in a common plane which is perpendicular to the longitudinal axis L and the central plane M, and the auxiliary arm 41 rests laterally against the transverse strut 19, and the end 43' of the tab 43 engages into the opening 44. Since the articulation 26 has a relatively large play when the clamping screw 38 is loosened and, furthermore, the diameter of the openings 23 is also larger than the diameter of the pivot pins 22, swinging of the transverse struts 18 and 19 relative to each other is possible also in the planes which are formed by the longitudinal axis of the corresponding transverse strut and the axis of the corresponding pivot pin 22, as indicated by the double-ended arrow C in FIG. 3, so that, in all cases, the engagement of the tab 43 into the opening 44 is possible. By the moment of rotation which is exerted by the rubber buffer 25 in the direction corresponding to the arrow A, a spring-actuated engagement takes place, so that even when the clamping screw 38 is not yet tightened, the golf cart is locked in the unfolded position. If the clamping screw 38 is tightened and the clearance in the articulation 26 thus taken up, the transverse struts 18 and 19 pass into a position in which the axes of these transverse struts are coaxial. In particular, when the clamping screw 38 is tightened, escape of the transverse strut 19 relative to the auxiliary arm 41 and the tab 42 in downward direction is no longer possible, so that a form-locked engagement of the tab 43 in the opening 44 is obtained.

It is obvious that before the tightening of the clamping screw 38, the handlebar 36 has also been brought into its unfolded position.

In order to bring the golf cart from the unfolded position into the folded position, the clamping screw 38 is loosened, the handlebar is pushed back into the position of non-use, and, thereupon, by pressing on the handle 38, the two transverse struts 18 and 19 are swung relative to each other against the spring action of the rubber buffer 25 in such a manner that the strap 42 lifts off from the top of the transverse strut 19 to such an extent that the tab 43 comes out of engagement with the opening 44, so that the transverse-strut arrangement 17 can be brought into the condition corresponding to the folded position of non-use.

Since the pivot pins 22 are increasingly inclined with respect to the plane E1 when the golf cart is brought from the folded position into the unfolded position and, as a result, the rubber buffers come increasingly more firmly to rest against these transverse struts and, in addition to this, also rest on the corresponding reinforcement elements 1 and 2, the rubber buffers 25 also experience elastic torsional deformation when the golf cart is in the position of use in the manner that each transverse strut 18–21 is urged by the corresponding rubber buffer 25 to swing into the folded position when the golf cart is folded. In this way, the bringing of the golf cart from the unfolded position into the folded position is greatly simplified.

Figure 6:
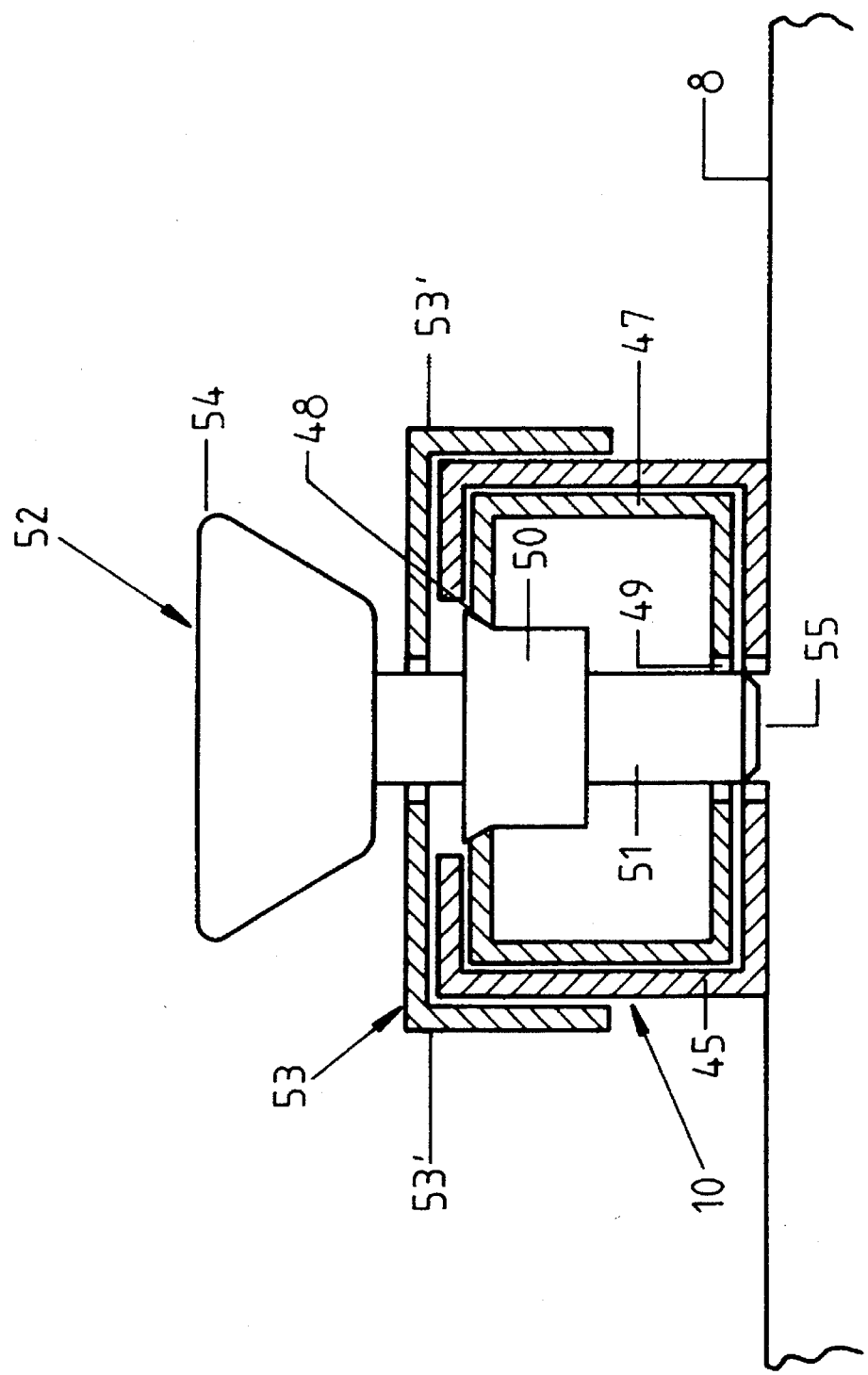
FIG. 6 shows the guide for the wheel support in cross section, along the section line II—II of FIG. 1.

FIG. 6 is a section through the guide 10 and the wheel support 11 present there.

The guide 10 consists essentially of a length of a C-shaped channel element which is fastened at both ends to the top and bottom sides of the corresponding storage elements 1 and 2, respectively. Furthermore, on each end of the C-shaped channel element 45 there is provided a yoke 46 shown in FIG. 1 which grips over said C-shaped channel element and is held on the outer side surface 8 of storage element 1.

Each wheel support 11 consists of a length of a closed rectangular section 47 which fits into the C-shaped section channel element 45 and is guided for displacement in a longitudinal direction in it. The corresponding holder 13 is provided on the one end of the section 47 shown in FIG. 7. In the region of the other end, the rectangular section 47 has two holes 48 and 49 which coincide with each other and have their axes parallel to the arms of the C-shaped section channel element. A nut 50 for the threaded part 51 of a clamping screw is fastened by pressing into the hole 48. The threaded part 51 extends outward through the opening of the C-shaped channel element 45 and a U-shaped channel element 53 engages the threaded part 51, the arms of said U-shaped channel element engaging the outer surface of the C-shaped channel element. The clamping screw 52 furthermore has a handle 54.

Within each guide 10 or in each C-shaped channel element 45, two openings 55 are provided on the bottom or yoke surface, facing away from the opening in said C-shaped channel element, by which the C-shaped channel element 45 rests against the corresponding storage element 1 or 2, the end of the threaded section 51 facing away from the handle 54 being movable into said openings by corresponding turning of the locking screw 52 in the nut 50 in order to lock the wheel support 11 in the guide 10. On each guide or each C-shaped channel element 45 there are provided two openings 55, namely one for the folded position of the corresponding wheel support 11 and one for the unfolded position. The maximum amount of movement of the corresponding wheel support or rectangular section 47 in the C-shaped channel element 45 of guide 10 is limited by the yokes 46 which form stops for the U-shaped channel element 53. Due to the fact that the arms 53' of this U-shaped channel element 53 lie along the outer surfaces of the C-shaped channel element 45 of guide 10, a high degree of stability is obtained. In particular, bending of the C-shaped channel element 45 is prevented.

The invention has been described with reference to several embodiments. It is obvious that changes as well as modifications are possible without thereby going beyond the scope of the invention. Instead of the opening 44 and the projection 43, the projections 43a and the corresponding openings 44a could also be used in the articulation 26.

I claim:

1. A cart for golf clubs having a folded and an unfolded condition, said cart comprising:

two storage elements, each storage element having a top side and a bottom side, each storage element having several compartments for holding the golf clubs;

a pivot swingably connecting the top sides of said storage elements so as to permit them to swing about a longitudinal axis of the golf cart, from the folded position in which the bottom sides of the storage elements are adjacent to each other, into an unfolded position in which the bottom sides of said storage elements are separated from each other;

a strut arrangement connecting the bottom sides of said storage elements, said arrangement having two strut elements, each strut element having a respective inner and outer end, a pivot connecting said outer end of each of said strut elements to the bottom sides of respective storage elements, and an articulation connected by a pivot to an inner end of each respective strut element in the region of a central vertical plane which contains the longitudinal axis of the golf cart, said articulation providing clearance between said strut elements and said articulation so as to permit said strut elements to swing into alignment with each other about the axis of the respective pivot so that said strut elements are transverse to said central vertical plane when the cart is in the unfolded condition, and clamping means for reducing said clearance between the respective inner end of a strut element and said articulation in a plane including one of said pivot axes;

a handlebar attached to said strut arrangement; and lock means including a projection and a recess upon said strut arrangement, said projection and recess being adapted to lock said strut elements in a position perpendicular to said central vertical plane, said projection and said recess being adapted to be engaged with each other by said clamping means.

2. The cart according to claim 1, wherein said projection is on one strut element and said recess is on the other strut element.

3. The cart according to claim 1, wherein said projection is on a strut element and said recess is on said articulation.

4. The cart according to claim 1, wherein said articulation includes a guide, said handlebar being displaceable along a longitudinal dimension of said guide, and said clamping means also fixes the position of said handlebar.

5. The cart according to claim 1, wherein an elastically deformable element at the respective outer ends of said strut elements exerts a spring action on said strut element so that said projection snaps into said recess when the golf cart is unfolded.

6. The cart according to claim 5, wherein said elastic element, in the unfolded position of the golf cart, exerts a moment of rotation on said respective strut element about an axis perpendicular to a plane including the axis of said pivot at the outer end of said strut element and the longitudinal axis of said strut element.

7. The cart according to claim 1, wherein one transverse strut element has an extension on which said projection is provided and the other transverse strut element has said recess.

8. The cart according to claim 1, wherein said articulation includes clamping bolts, said bolts being held on one clamping-jaw element and wherein said clamping means includes a clamp element having a clamping screw adapted to clamp together said clamping-jaw elements, said bolts being adapted to engage said clamp element.

9. The cart according to claim 8, wherein said clamp element is a clamping yoke through which passes a guide for said handlebar, as well as said handlebar in said guide, and wherein said clamping screw acts on the other clamping-jaw element through said handlebar.

10. A cart according to claim 1, wherein two pairs of transverse strut elements are provided with respective articulations, and said guide for the handlebar is attached to both articulations.

11. The cart according to claim 10, wherein a wheel support guide is provided on each of the storage elements, said guide including a C-shaped channel element through which an elongated wheel support passes, said guide having a U-shaped channel element which lies across the open side of said C-shaped channel element and along the outer surfaces of said C-shaped channel element.

12. A cart according to claim 11, wherein said wheel support guide includes a screw on said U-shaped channel element, said screw being axially movable into cooperation with locking openings on said guide, whereby said wheel support can selectably be locked in a folded or unfolded position.

13. A golf cart comprising:

two rigid storage elements, each of which has a top side and a bottom side and forms several compartments for holding golf clubs, wherein the top sides of said storage elements are swingably connected to each other around a longitudinal axis of the golf cart and can be swung around this axis from a folded position, in which said storage elements are adjacent to each other, into an unfolded position, in which said storage elements form an angle with each other opening towards a lower side of the golf cart;

a strut arrangement which, in the unfolded position of the golf cart, provides for a fixed distance between the bottom sides of said storage elements, said strut arrangement having two strut elements, said strut elements being connected at their respective outer ends to the bottom of storage element by a pivot, the inner ends of said strut elements being pivotably connected to an articulation having at least one pivot axis in the region of a vertical central plane containing said longitudinal axis of the golf cart, said strut elements being aligned so as to be coplanar and transverse to the golf cart central plane when the golf cart is in the unfolded condition, said articulation including two clamping-jaw elements between which the inner ends of said strut elements are pivoted and clamping means by which said two clamping-jaw elements can be locked fast against both sides of the inner ends of said strut elements so that said articulation can be shifted from a first condition, in which said articulation has a clearance such that the inner ends of said strut elements are swingable by a predetermined amount in a plane including at least one pivot axis of said articulation, into a second condition, in which said strut elements are connected to said articulation without said clearance;

a handlebar attached to said strut arrangement; and lock means for locking said strut elements in a position corresponding to the unfolded condition, said lock means including a projection on one strut element and a recess on the other strut element, said projection being locked in said recess when said two clamping-jaw elements are locked fast against said inner ends of said strut elements.

14. A golf cart according to claim 13, wherein said clamping-jaw elements are plates.

15. A golf cart comprising:

two rigid storage elements, each of which has a top side and a bottom side and forms several compartments for holding golf clubs, wherein the top sides of said storage elements are swingably connected to each other around a longitudinal axis of the golf cart and can be swung around this axis from a folded position, in which said storage elements are adjacent to each other, into an unfolded position, in which said storage elements form an angle with each other opening towards a lower side of the golf cart;

a strut arrangement which, in the unfolded position of the golf cart, provides for a fixed distance between the bottom sides of said storage elements, said strut arrangement having two strut elements, said strut elements being connected at their respective outer ends to the bottom of storage element by a pivot, the inner ends of said strut elements being pivotably connected to an articulation having at least one pivot axis in the region of a vertical central plane containing said longitudinal axis of the golf cart, said strut elements being aligned so as to be coplanar and transverse to the golf cart central plane when the golf cart is in the unfolded condition, said articulation including two clamping-jaw elements between which the inner ends of said struts are pivoted and clamping means by which said two clamping-jaw elements can be locked fast against both sides of the inner ends of said strut elements so that said articulation can be shifted from a first condition, in which said articulation has a clearance such that the inner ends of said strut elements are swingable by a predetermined amount in a plane including at least one pivot axis of said articulation, into a second condition, in which said strut elements are connected to said articulation without said clearance;

a handlebar attached to said strut arrangement; and lock means for locking said strut elements in a position corresponding to the unfolded condition, said lock means including a projection on one strut element and a recess on said articulation, said projection being locked in said recess when said two clamping-jaw elements are locked fast against said inner ends of said strut elements.

16. A golf cart according to claim 15, wherein said clamping-jaw elements are plates.

* * * * *